(12) United States Patent
Lawford et al.

(10) Patent No.: US 6,903,055 B2
(45) Date of Patent: Jun. 7, 2005

(54) LUBRICATING OILS COMPRISING POLYOXYALKYLENGLYCOL DERIVATIVES

(75) Inventors: Simon Lawford, Dorset (GB); John Robert Moxey, Salisbury (GB); Andrew Small, Southampton (GB)

(73) Assignee: Cognis Performance Chemicals UK Limited, Southampton (GB)

( * ) Notice: Subject to any disclaimer, the term of this patent is extended or adjusted under 35 U.S.C. 154(b) by 249 days.

(21) Appl. No.: 10/182,645

(22) PCT Filed: Jan. 23, 2001

(86) PCT No.: PCT/GB01/00251

§ 371 (c)(1),
(2), (4) Date: Oct. 28, 2002

(87) PCT Pub. No.: WO01/57164

PCT Pub. Date: Aug. 9, 2001

(65) Prior Publication Data

US 2003/0153470 A1 Aug. 14, 2003

(30) Foreign Application Priority Data

Feb. 2, 2000 (GB) .............................................. 0002260

(51) Int. Cl.⁷ .................. C10M 107/34; C10M 107/46; C10M 139/00
(52) U.S. Cl. ........................ 508/199; 508/197; 508/302; 508/307; 252/68
(58) Field of Search ................... 549/66, 502; 252/68; 508/302, 303, 307, 197, 199

(56) References Cited

U.S. PATENT DOCUMENTS 5,094,768 A * 3/1992 Jolley ........................... 252/67
5,512,198 A * 4/1996 Sasaki et al. .................. 252/68
5,595,678 A * 1/1997 Short et al. .................... 252/68
5,746,933 A * 5/1998 Ishida et al. ................... 252/68

FOREIGN PATENT DOCUMENTS

| EP | 0 460 613 A | 12/1991 |
| EP | 0 504 410 A | 9/1992 |
| EP | 0 582 451 A | 2/1994 |
| EP | 0 711 824 A | 5/1996 |
| EP | 0 913 456 A | 5/1999 |
| WO | WO 91 15551 A | 10/1991 |
| WO | WO 98 38264 A | 9/1998 |

OTHER PUBLICATIONS

Patent Abstracts of Japan, vol. 008, No. 118 (C–226), May 31, 1984 & JP 59 029625 A (Nitsusou Yuka Kogyo KK), Feb. 16, 1984 Abstract.

\* cited by examiner

*Primary Examiner*—Ellen M. McAvoy
(74) *Attorney, Agent, or Firm*—Nixon & Vanderhye

(57) ABSTRACT

A composition is disclosed which comprises a lubricating oil and a refrigerant, wherein the lubricating oil comprises a polyalkyleneglycol derivative of the formula (I): $RX(R^aO)_x(R^bO)_y(R^cO)_zR^d$, wherein: X=O or S, R is a $C_3$ to $C_{15}$ substituent comprising a heterocyclic ring, in which the heteroatom(s) in said ring is (are) oxygen and/or sulphur, $R^a$ is a $C_2$ alkylene group, $R^b$ is a $C_3$ alkylene group, $R^c$ is a $C_4$ alkylene group, $R^d$ is the same as R, or is H, a $C_1$–$C_{20}$ alkyl or a $C_1$–$C_{20}$ acyl, x, y, z are each independently 0 or an integer of 100 or less, and x+y+z=4 to 100, but excluding compositions where the refrigerant is halogen-free and R contains a carbonate group. The use of borate esters as dehydrogenating agents in conjunction with the above lubricating oils is also disclosed.

14 Claims, No Drawings

LUBRICATING OILS COMPRISING POLYOXYALKYLENGLYCOL DERIVATIVES

The present invention relates to a polyalkylene glycol derivative for use as a lubricating oil, and more particularly, for use as a lubricating oil in compression-type refrigerators.

In a conventional compression-type refrigerator, a mixture of a refrigerant and a lubricating oil is circulated through a number of units including a compressor, which exerts pressure on the gaseous refrigerant to convert it into a liquid. Such units comprise moving parts, and the lubricating oil is necessary to reduce friction between these parts. In addition to such lubricating properties, it is desirable for the lubricating oil to be compatible with the refrigerant. This is because the temperatures encountered by the refrigerant/lubricating oil mixture may range from 65° C. in the compressor, to −40° C. in the cooler. If the lubricating oil is incompatible with the refrigerant at any point within this temperature range, phase separation may occur, reducing the efficiency of the lubrication and refrigeration process.

Various lubricating oils for refrigerants are known. U.S. Pat. No. 4,755,316, for instance, discloses lubricating oil compositions containing one or more polyether polyols. The composition is suitable for use with compression refrigerants, such as 1,1,1,2-tetrafluoroethane (R134a).

U.S. Pat. No. 4,851,144 also describes lubricating oils which are suitable for refrigerants such as R134a. The lubricating oils of U.S. Pat. No. 4,851,144 are based on mixtures of polyether polyols, and esters.

In EP 377122A and EP 634467A, a lubricating oil based on a derivative of polyoxyalkylene glycol is disclosed. One of the lubricating oils disclosed is represented by the general formula:

$$R^1[(OR^2)_mOR^3]_n$$

wherein $R^1$ is an alkyl group having 1 to 10 carbon atoms, an acyl group having 1 to 10 carbon atoms or an aliphatic hydrocarbon group having 2 to 6 valencies;

$R^2$ is an alkylene group having 2 to 4 carbon atoms;

$R^3$ is an alkyl group having 1 to 10 carbon atoms, or an acyl group having 1 to 10 carbon atoms, n is an integer of 1 to 6, and m is an integer of 1 to 80.

EP 913456A discloses lubricants for halogen-free refrigerants corresponding to the general formula above but where $R^1$ is a 5-membered cyclic alkylene carbonate (ie containing an —O—(C=O)—O— group). There is no suggestion that they would have suitable solubility characteristics to enable them to be used with halogenated refrigerants as well.

We have now developed a new lubricating oil based on a derivative of polyoxyalkylene glycols having a heterocyclic substituent.

According to the present invention, there is provided a lubricating oil comprising a polyalkyleneglycol derivative of the formula (I):

$$RX(R^aO)_x(R^bO)_y(R^cO)_zR^d \qquad (I)$$

wherein:

X=O or S,

R is a $C_3$ to $C_{15}$ substituent comprising a heterocyclic ring, in which the heteroatom(s) in said ring is (are) oxygen and/or sulphur, $R^a$ is a $C_2$ alkylene group, $R^b$ is a $C_3$ alkylene group, $R^c$ is a $C_4$ alkylene group, $R^d$ is the same as R, or is H, a $C_1$–$C_{20}$ alkyl or a $C_1$–$C_{20}$ acyl, x, y, z are each independently 0 or an integer of 100 or less, and x+y+z=4 to 100.

X is preferably oxygen.

The products of the present invention have demonstrated a considerable advantage over commercially available dimethyl ethers (which are similar to those described it in EP 634467), in that they show no separation at low temperatures. Modern compressors can work down to −60° C. or below, and hence this has become an increasingly important aspect; low temperature separation in compression type refrigerators can result in incomplete carry through and circulation of the lubricant, leading to wear problems and the like.

As mentioned above, R is a substituent comprising a $C_3$ to $C_{15}$ heterocyclic species, in which the heteroatom(s) in the heterocyclic ring is oxygen and/or sulphur. Preferably, the heterocyclic ring comprises oxygen or sulphur. The heterocyclic ring may be saturated or unsaturated. For example, R may comprise a saturated cyclic ether or saturated cyclic thioether. Such cyclic compounds may or may not be substituted. When substituted, the heterocycle may be linked to X via the or a substituent, which in such a case may be a hydrocarbyl linkage, eg —CH$_2$—, —C$_2$H$_4$— or —C$_3$H$_6$—. Preferably, R comprises a $C_4$ to $C_6$ heterocyclic moiety which is attached to X either directly or via a hydrocarbyl linkage. For example, the heterocyclic moiety may be a furan or a thiophene ring. The heterocyclic moiety may alternatively be furfuryl, or a furfuryl derivative such as tetrahydrofurfuryl, attached to X either directly or via a hydrocarbyl linkage. Examples of compounds from which R may be derived include tetrahydrofuran, methyltetrahydrofuran, tetrahydrothiophene or methyltetrahydrothiophene substituents. A preferred example of R is derivable from 2-hydroxymethyltetrahydrofuran, which may be regarded as having the formula R—XH according to the above definition, such that R is derived from methyltetrahydrofuran and X is O.

Each of $R^a$, $R^b$ and $R^c$ may be represented by formula II:

$$[-C(R^e)(R^f)-C(R^g)(R^h)-] \qquad (II)$$

In the case of $R^a$, each of $R^e$, $R^f$, $R^g$, and $R^h$ is hydrogen. In the case of $R^b$, one of $R^e$, $R^f$, $R^g$, and $R^h$ is methyl and the others are hydrogen. In the case of $R^c$, either one of $R^e$, $R^f$, $R^g$, and $R^h$ is ethyl or two of $R^e$, $R^f$, $R^g$, and $R^h$ is methyl, the remainder being hydrogen. For example, $R^c$ may be a butylene group or an iso-butylene group.

Preferably, only one or two of $R^a$, $R^b$ and $R^c$ are present in formula I. In other words, in preferred embodiments of the invention one or two of x, y and z is zero. For example, x may be zero, and/or z may be zero.

$R^d$ may be the same as R, or may be an H, a $C_1$–$C_{20}$ alkyl or a $C_1$–$C_{20}$ acyl. Where $R^d$ is a $C_1$–$C_{20}$ alkyl or a $C_1$–$C_{20}$ acyl group, it preferably has 1 to 15 carbon atoms, more preferably, 1 to 10 carbon atoms, and most preferably, 1 to 6 carbon atoms. Where $R^d$ is a $C_1$–$C_{20}$ alkyl group, the alkyl group may be straight chain, branched chain or a cyclic alkyl group. Suitable alkyl groups include methyl, ethyl, propyl, butyl, pentyl, and hexyl groups. Where $R^d$ is a $C_1$–$C_{20}$ acyl group, the acyl group may be straight chain, branched chain or cyclic. The acyl group may have further substituents, for example, alkyl substituents, which may be a straight chain, branched chain or cyclic alkyl substituent. Such alkyl substituents include methyl, ethyl, propyl, butyl, pentyl, and hexyl groups.

x+y+z=4 to 100 (inclusive). Preferably, the sum is equal to a number between 5 and 50 (inclusive), more preferably, between 15 and 40, and most preferably, between 15 and 25.

In one embodiment, x=0, z=0 and y=18. In another embodiment, x=0, y=17 and z=1.

The polyalkyleneglycol derivative of the formula (I) may be prepared by any suitable method known in the art. Suitable methods are described in Methods A, B and C described on pages 7 to 8 of EP 0634467. A preferred method, however, is described below.

A compound of the formula RXH (R and X as defined above) is employed as an initiator, and reacted with ethylene oxide, propylene oxide and/or butylene oxide. Ethylene oxide, propylene oxide or butylene oxide may each be used on its own, or mixtures of two or more of such alkylene oxides may be employed. Where two or more alkylene oxides are employed, these alkylene oxides may be reacted sequentially in any order. Thus, RXH may be reacted with one of ethylene oxide, propylene oxide, or butylene oxide, and the resulting product reacted with a different alkylene oxide selected from that list, or vice-versa. Optionally, the resulting product may be reacted further, for example, with yet a different alkylene oxide altogether, or alternatively, the same alkylene oxide that was used in the first addition step. In one embodiment, RXH is first polymerised with propylene oxide, and the resulting product is reacted with iso-butylene oxide.

The initiator may be used either as RXH or as an alkali metal salt thereof. Examples of suitable initiators include 3-hydroxy tetrahydrofuran, 2-hydroxymethyltetrahydrofuran, 2-hydroxymethyltetrahydrothiophen, furyl alcohol, 2-hydroxymethyltetrahydropyran, and 3-hydroxyfuran.

The reaction is preferably catalysed by a base, a Lewis acid or a double metal cyanide. Suitable acids include boron trifluoride. Suitable bases include potassium hydroxide. The resulting product may comprise a polyalkyleneglycol derivative of the formula (I), wherein $R^d$ is H.

Such a product may be further reacted using reactions known in the art, such that $R^d$ is converted to an alkyl, an acyl group or to a group identical to R. For example, the product may be reacted with an alkyl chloride or dialkyl sulphate to produce a polyalkyleneglycol derivative of the formula (I), wherein $R^d$ is an alkyl group. Alternatively, the product may be esterified either directly or indirectly to produce a polyalkyleneglycol derivative of the formula (I), wherein $R^d$ is an acyl group. To obtain a product in which $R^d$ is the same as R, the product may be reacted with for example, the appropriate chloride. For example, where R is derived from 2-hydroxymethyltetrahydrofuran, the product may be reacted with 2-(choromethyl)-terahydrofuran. Alternatively, two equivalents of the product may be reacted with ethylene dibromide.

The lubricating oil of the present invention may be used as a lubricant for industrial, automotive and refrigeration/air-conditioning applications. For example, the oil may be used to lubricate gears, bearings and compression-type refrigerators. The present invention is very suitable for the latter application because it is highly compatible with refrigerants, such as fluorocarbons, hydrocarbons (e.g. propane), ammonia, and carbon dioxide. Of these refrigerants, the present invention has been found to be particularly useful for lubricating fluorocarbons such as 1,1,1,2-tetrafluoroethane (R134a), difluoromethane (R32), pentafluoroethane (R125) and 1,1,1-trifluoroethane (R143a) and blends thereof. The present invention may even improve the compatibility of other lubricating oils with such refrigerants. For this reason, the lubricating oil of the present invention may be blended with other lubricating oil(s) to produce a lubricating composition for such refrigerants.

The lubricating oil may also be used in combination with other additives, such as extreme pressure, antiwear, anticorrosion, antioxidants, and viscosity improver additives. Other additives include acidity regulators, reactive water-eliminating additives, antifoams, and demulsifiers The lubricating oil of the present invention may have a viscosity of 2 to 50 cSt at 100° C. Preferably, the viscosity of the oil is 5 to 30 cSt, more preferably, 6 to 30 cSt, and most preferably, 9 to 30 cSt.

The lubricating oil of the present invention may be used in combination with a dehydrating agent. Any suitable dehydrating agent may be employed. Dehydrating agents may be employed to reduce the water content of lubricating oils from typical values of 0.1 to 0.5 wt % or more, to values of less than 0.05 wt %, for example, less than 0.015 wt %. This is an advantage because water tends to freeze and separate from the lubricating oil at temperatures below 0° C. in the expansion bulb of the compressor. This separation reduces the effectiveness of the lubrication A number of conventional dehydrating agents are known. Typically, these are heterogeneous agents, such as molecular sieves, which have to be incorporated into the compressor design. Although such agents may be effective, they add complexity to the compressor design. Accordingly, it is desirable to use homogeneous chemical dehydrating agents, which can simply be blended with the lubricating oil.

We have found that certain borate esters, in particular, those falling within the definition of Formula III below have useful dehydrating characteristics:

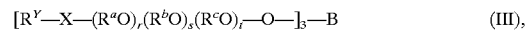

$$[R^Y\!-\!X\!-\!(R^aO)_r(R^bO)_s(R^cO)_t\!-\!O\!-\!]_3\!-\!B \quad\quad (III),$$

wherein X=O or S, $R^Y$ is a $C_1$–$C_{10}$ alkyl, or a $C_3$ to $C_{15}$ substituent comprising a heterocyclic ring, in which the heteroatom(s) in said ring is (are) oxygen and/or sulphur, $R^a$ is a $C_2$ alkylene group, $R^b$ is a $C_3$ alkylene group, $R^c$ is a $C_4$ alkylene group, r, s, t are each independently 0 or an integer of 50 or less, and r+s+t=3 to 50 (inclusive).

Where $R^Y$ is a $C_1$ to $C_{10}$ alkyl, both straight chained and branched alkyl substituents may be employed. $C_1$ to $C_6$ alkyls are preferred. Suitable examples include methyl, propyl, butyl, pentyl, and hexyl. Preferably, $R^Y$ is methyl.

$R^Y$ may also have the same meaning as R above.

The $R^Y$ group may be derived from an $R^Y$XH initiator.

As described in connection with Formula I, $R^a$, $R^b$ and $R^c$ may each be derived from alkylene oxides. In the preparation of the borate ester III, such alkylene oxides may be reacted with $R^Y$XH initiators. Where two or more $R^a$, $R^b$ and $R^c$ groups are present, a mixture of two or more alkylene oxides may be reacted with the initiator. It is possible, however, to react different alkylene oxides sequentially in separate reaction steps.

The present invention provides in a further aspect a composition comprising a refrigerant, a lubricating oil, and a borate ester of the formula (III). As the borate ester III itself possesses lubricant properties, it may be used in any proportion. Preferably, however, the ester III forms 1 to 25 wt % of the lubricating oil/ester mixture (excluding the refrigerant).

The invention also includes in another aspect the use of a borate ester of the formula (III) as a dehydrating agent for a lubricating oil used in conjunction with a refrigerant. Preferably the lubricating oil is of the formula (I).

Preferably, the lubricating oil/borate ester composition of the present invention comprises 50 to 99 wt % of the lubricating oil. More preferably, the composition comprises 95 to 100 wt % of the lubricating oil. The composition may also comprise additives such as antioxidant, antiwear, extreme pressure, anti-corrosion and acidity scavenger additives. Typically, however, such additives only form 0.1 to 5 wt % of the total weight of the composition.

The borate ester of Formula III may be prepared by the reaction of a polyalkylene glycol with boric acid. The water of reaction may then be removed by distillation.

It has also been found that the borate ester of Formula III itself has good lubricating properties. Furthermore, the ester (III) has been found to be highly compatible with refrigerants, such as fluorocarbons, hydrocarbons (eg propane), ammonia, and carbon dioxide. Of these refrigerants, the ester (III) has been found to be particularly useful for lubricating fluorocarbons such as 1,1,1,2-tetrafluoroethane (R134a), difluoromethane (R32), pentafluoroethane (R125) and 1,1,1-trifluoroethane (R143a) and blends thereof. Accordingly, another aspect of the present invention is the use of the borate ester of the formula III above as a lubricating oil for such refrigerants.

These and other aspects of the present invention will now be described by way of illustration with reference to the following Examples:

EXAMPLE 1

2-hydroxymethyltetrahydrofuran was used as the initiator (RXH). This compound was reacted with propylene oxide under the reaction conditions described below. Both the intermediate and the final product formed in this example fall within the definition of Formula I above. However, whereas the intermediate had a y value of about 9. the y value of the final product was about 18. The x and z values of both the intermediate and final products were respectively zero.

2-hydroxymethyltetrahydrofuran (1062 g) was charged into a 10 litre pressure reactor. 24.3 g of potassium methoxide was then added, this amount being necessary to give a concentration of 0.20% in the final product.

Propylene oxide (5000 g) was then added to the reactor at a reaction temperature of 120° C. on an automatic demand system. After reacting to constant pressure, an intermediate (3152 g) was removed. This intermediate had a hydroxyl number of 99.1 mg. KOH/g.

To the remaining 2934 g in the reactor, a further 2885 g propylene oxide was added, also at 120° C., to give the final product which, after treatment with magnesium silicate to remove the catalyst, had a hydroxyl number of 52.3. This hydroxyl number is indicative of a y value of 18. This product had a viscosity at 40° C. of 58.4 cSt, with a pH of 6.6, a water content of 0.03%, and colour of 30 Hazen. The viscosity at 100° C. was 10.7 cSt.

EXAMPLE 2

In this Example, the final product of Example 1 was reacted with isobutylene oxide. The resulting product was found to have a y value of 17 and a z value of 1.

A second sample product made as in Example 1 (4.7 kg, hydroxyl number of 55.8) was reacted with isobutylene oxide (400 g, 1 mole) at 120° C. After removal of catalyst, the product (5.1 kg) had the following properties.

| | |
|---|---|
| Hydroxyl No. (mgKOH/g) | 12.8 |
| Viscosity @ 40° C. (cSt) | 57.6 |
| Water (%) | 0.02 |
| PH (IPS/Water) | 6.9 |
| Colour (Pt/Co) | 50 |
| Appearance | Clear |

EXAMPLE 3

In this Example, the final product of Example 1 was capped with a methyl group, such that $R^d$ was methyl.

3000 g of the final product of Example 1 was reacted with 756 g (1.25 equivalents) sodium methoxide in vacuo at 90° C. for four hours. 282 g (2 equivalents) methyl chloride was then added to the mixture at 90° C. for four hours. The product was then acidified with aqueous hydrochloric acid to pH 5, and washed with water to remove salts. The product was separated and treated with magnesium silicate, filtered and dried. The resulting capped material had a residual hydroxyl of 5.3 (90% capped), a viscosity at 40° C. of 42.9, a viscosity at 100° C. of 9.2, giving a viscosity index-of 204.

EXAMPLE 4

In this example, a borate ester falling within the definition of Formula III above was synthesised.

A propoxylate of methanol (300 g) with a hydroxyl number of 50 (Mw 1122), viscosity=55 cSt@40° C. was mixed together with orthoboric acid (Mw 62) (5.5 g). The reactants were mixed with 100 ml of toluene, and the mixture heated at reflux using a Dean Stark apparatus, until water of reaction and water from the reagents had been removed (1.6 g and 2.4 g) and no further water separated. The solvent was then removed in vacuo to leave approximately 300 g of the borate triester.

EXAMPLE 5

In this Example, the lubricating oil produced in Example 3 was blended with the borate ester of Example 4 to produce a composition according to an embodiment of the present invention.

10 grams of the product of Example 4 were mixed with 100 g of the product of Example 3. The resulting mixture was analysed and found to have a water content of 0.0 wt %. The water content of the unblended lubricating oil (Example 3) was measured at 0.1 wt %.

EXAMPLES 6–14

Further polyalkylene glycols of differing molecular weights using different heterocyclic initiators were prepared according to the method of Example 1.

To the PAG was added 25% sodium methoxide (1.1 molar equivalent). The methanol was then removed by distillation; the temperature was slowly increased to 100° C. following which the vacuum was increased to 10 mbar. After 4 hours stripping under these conditions, the mixture was returned to atmospheric pressure using nitrogen gas. Methyl chloride (1.2 molar equivalents) was gently bubbled into the mixture at 85–90° C. over a three-hour period. The reaction mixture was then poured into a separating funnel and washed four times with 0.2 volumes of saturated brine. The product was finally dried at 100° for two hours and filtered to obtain the desired capped PAG. A summary of the polyalkylene glycols produced is shown in Table 1 below.

TABLE 1

| Ex. No | Propoxylate Initiator | Cap ($R^d$) | Starting OH No. | End OH No. | Capping (%) | Viscosity after capping, cSt. |
|---|---|---|---|---|---|---|
| 6 | Furfuryl alcohol | methyl | 64.7 | 3.8 | 94.1 | 50.4 (40° C.) 9.1 (100° C.) |
| 7 | THPM | methyl | 64.5 | 4.7 | 92.7 | |
| 8 | THFA | acetyl | 52.3 | 6.8 | 87.0 | |
| 9 | THFA | methyl | 27.0 | 2.0 | 92.6 | 159.0 (40° C.) |
| 10 | THFA | methyl | 32.1 | 1.5 | 95.3 | 100.7 (40° C.) |
| 11 | THFA | methyl | 66.5 | 1.0 | 98.5 | 28.6 (40° C.) |
| 12 | THFA | methyl | 82.5 | 5.2 | 93.7 | 20.4 (40° C.) |
| 13 | THFA | methyl | 105 | 4.6 | 95.6 | 13.5 (40° C.) |
| 14# | Propylene glycol | methyl | — | — | — | 46 |

Comparative Example: commercial product of Idemitsu Kosan Co - polypropylene glycol with both hydroxyl groups methyl capped.
THFA = 2-hydroxymethyltetrahydrofuran,
THPM = 2-hydroxymethyltetrahydropyran Low-Temperature Separation Tests As described previously, good low-temperature separation properties are an important requirement for lubricants used in modem compressors. The product of Example 3 was compared with that of comparative Example 14. Example 14 is a product of Idemitsu Kosan Co and is of a chemical nature identical or very similar to that of Example 8 of EP 377122A. It is the most similar to Example 3 in terms of viscosity, upper clouding temperature, and the linearity of chain structure. In the test, the lubricant and the fluorocarbon refrigerant are sealed in a tube and cooled. The temperature of any separation is observed. High-temperature separation can also be evaluated by heating the tube and observing. The results for the low-temperature separation are shown in Table 2 below. They show that the product of Example 3 does not separate even at the lowest temperature tested of −60° C. However, comparative Example 14 separates at much higher temperatures.

TABLE 2

| | Temperature of separation at low temperature | | | |
|---|---|---|---|---|
| Concentration in refrigerant (R134a) | 5% | 10% | 30% | 40% |
| Product of comparative Example 14 | −41° C. | −39° C. | 39° C. | −40° C. |
| Product of Example 3 | <−60° C. | <−60° C. | <−60° C. | <−60° C. |

Although certain examples in EP 377122A show lower separation temperatures, they are not directly comparable as they are generally not linear. The linear structures are the preferred commercial products, because they have the advantage of higher viscosity index, lower cost of capping, and can be made to the molecular weight requirements of very low viscosity now being demanded in energy saving compressors.

What is claimed is:

1. Lubricating oil composition comprising a polyalkyleneglycol derivative of the formula (I):

$$RX(R^aO)_x(R^bO)_y(R^cO)_zR^d \qquad (I)$$

wherein:
X═O or S,
R comprises a $C_4$ to $C_6$ heterocyclic moiety derived from tetrahydrofuran, methyltetrahydrofuran, tetrahydrothiophene, methyltetrahydrothiophene, furfuryl or tetrahydrofurfuryl, which is attached to X either directly or via a hydrocarbyl linkage, $R^a$ is a $C_2$ alkylene group,
$R^b$ is a $C_3$ alkylene group,
$R^c$ is a $C_4$ alkylene group,
$R^d$ is the same as R, or is H, a $C_1$–$C_{20}$ alkyl or a $C_1$–$C_{20}$ acyl,
x, y, z are each independently 0 or an integer of 100 or less, and x+y+z=4 to 100.

2. Composition according to claim 1 additionally comprising a refrigerant.

3. Composition according to claim 1 additionally comprising 1,1,1,2-tetrafluoroethane (R134a), difluoromethane (R32), pentafluoroethane (R125) or 1,1,1-trifluoroethane (R143a) or blends thereof.

4. Composition according claim 1 wherein each of $R^a$, $R^b$ and $R^c$ is represented by the formula [—$(R^e)(R^f)$—C$(R^g)(R^h)$—]

wherein:
in the case of $R^a$, each of $R^e$, $R^f$, $R^g$, and $R^h$ is hydrogen;
in the case of $R^b$, one of $R^e$, $R^f$, $R^g$, and $R^h$ is methyl and the others are hydrogen;
in the case of $R^c$, either one of $R^e$, $R^f$, $R^g$, and $R^h$ is ethyl, or two of $R^e$, $R^f$, $R^g$, and $R^h$ are methyl, the remainder being hydrogen.

5. Composition according to claim 1 wherein one or two of x, y and z is zero.

6. Composition according to claim 1 wherein
$R^d$ is methyl, ethyl, propyl, butyl, pentyl, hexyl or acyl optionally substituted with methyl, ethyl, propyl, butyl, pentyl, or hexyl groups.

7. Composition according to claim 1 wherein x+y+z=5 to 50.

8. Composition according to claim 1 additionally comprising a borate ester of the formula (III)

$$[R^y—X—(R^aO)_r(R^bO)_s(R^cO)_t—O—]_3—B \qquad (III),$$

wherein X═O or S,
$R^y$ is a $C_1$–$C_{10}$ alkyl, or a $C_3$ to $C_{15}$ substituent comprising a heterocyclic ring, in which the heteroatom(s) in said ring is (are) oxygen and/or sulphur,
$R^a$ is a $C_2$ alkylene group,
$R^b$ is a $C_3$ alkylene group,
$R^c$ is a $C_4$ alkylene group,
r, s, t are each independently 0 or an integer of 50 or less, and
r+x+t=3 to 50 (inclusive).

9. Composition according to claim 8 wherein $R^y$ is methyl, propyl, butyl, pentyl, or hexyl.

10. Composition according to claim 8 wherein the borate ester is the reaction product of orthoboric acid and a propoxylate of methanol.

11. Composition according to claim 8 wherein the borate ester of the formula (III) is present in an amount of from 1 to 25 wt % based on lubricating oil plus ester only.

12. Composition according to claim 7 wherein x+y+z=15 to 40.

13. Composition according to claim 7 wherein x+y+z=15 to 25.

14. Method for dehydrating a lubricating oil, comprising contacting said lubricating oil with a borate ester of formula (III):

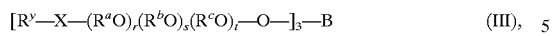

$$[R^y\text{—}X\text{—}(R^aO)_r(R^bO)_s(R^cO)_t\text{—}O\text{—}]_3\text{—}B \qquad (III),$$

wherein X=O or S, $R^y$ is a $C_1$–$C_{10}$ alkyl, or a $C_3$ to $C_{15}$ substituent comprising a heterocyclic ring, in which the heteroatom(s) in said ring is (are) oxygen and/or sulphur, $R^a$ is a $C_2$ alkylene group, $R^b$ is a $C_3$ alkylene group, $R^c$ is a $C_4$ alkylene group, r, s, t are each independently 0 or an integer of 50 or less, and r+x+t=3 to 50 (inclusive).

* * * * *